US012665734B2

(12) United States Patent
Abdelghaffar et al.

(10) Patent No.: US 12,665,734 B2
(45) Date of Patent: Jun. 23, 2026

(54) HALF-DUPLEX USER EQUIPMENT OPERATION IN INTRA-BAND CARRIER AGGREGATION SUB-BAND FULL DUPLEX COMMUNICATIONS SYSTEMS

(71) Applicant: QUALCOMM Incorporated, San Diego, CA (US)

(72) Inventors: Muhammad Sayed Khairy Abdelghaffar, San Jose, CA (US); Qian Zhang, Basking Ridge, NJ (US); Abdelrahman Mohamed Ahmed Mohamed Ibrahim, San Diego, CA (US); Ahmed Attia Abotabl, San Diego, CA (US); Yan Zhou, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 944 days.

(21) Appl. No.: 17/819,489

(22) Filed: Aug. 12, 2022

(65) Prior Publication Data

US 2024/0056283 A1    Feb. 15, 2024

(51) Int. Cl.
 *H04L 5/16* (2006.01)
 *H04W 72/23* (2023.01)
(52) U.S. Cl.
 CPC ............... *H04L 5/16* (2013.01); *H04W 72/23* (2023.01)
(58) Field of Classification Search
 CPC .................................. H04L 5/16; H04W 72/23
 See application file for complete search history.

(56) References Cited

U.S. PATENT DOCUMENTS

2015/0333896 A1* 11/2015 Damnjanovic ........... H04L 5/16
                                                   370/277
2022/0232655 A1*  7/2022 Noh ...................... H04W 76/16

* cited by examiner

*Primary Examiner* — Samina F Choudhry
(74) *Attorney, Agent, or Firm* — Harrity & Harrity, LLP

(57) ABSTRACT

Certain aspects of the present disclosure provide techniques for transmitting a user equipment (UE) capability indication that identifies an intra-band carrier aggregation capability for a half-duplex operation by the UE. Certain aspects of the present disclosure provide techniques for communicating on a sub-band full duplex communication link, wherein the communicating is based at least in part on an evaluation of one or more directional collision handling rules associated with the UE capability indication.

22 Claims, 14 Drawing Sheets

900

905

Option 1: Transmit PUSCH
Option 2: based on priority
Option 3: receives DL

910

Option 1: Receives PDSCH
Option 2: based on priority
Option 3: transmit UL

1000

1005

UE receives the PUSCH and
consider the 'D' as 'F'

1010

The UE receives the PDSCH
and consider the 'U' as flexile

1100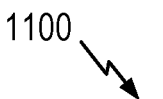

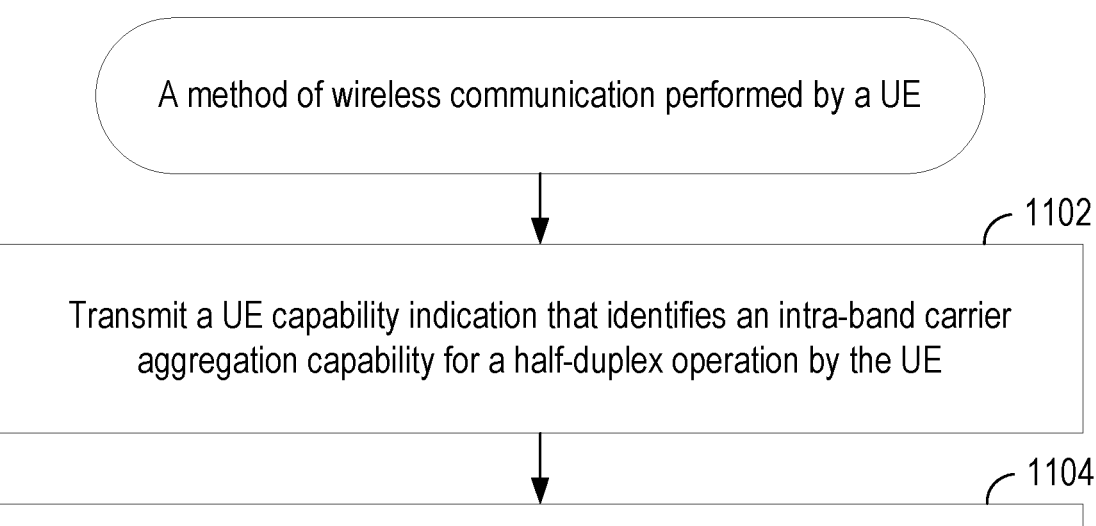

A method of wireless communication performed by a UE

1102

Transmit a UE capability indication that identifies an intra-band carrier aggregation capability for a half-duplex operation by the UE

1104

Communicate on a sub-band full duplex communication link, wherein the communicating is based at least in part on an evaluation of one or more directional collision handling rules associated with the UE capability indication

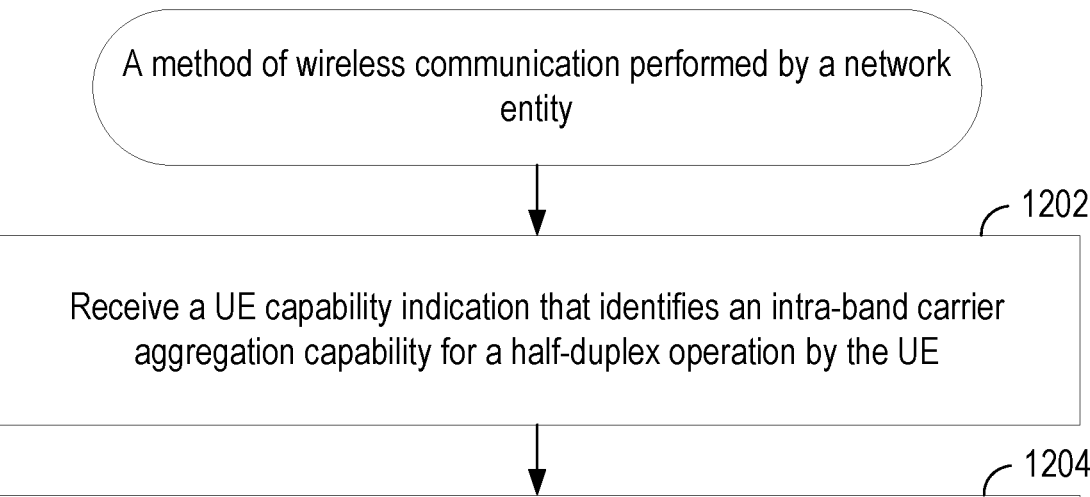

A method of wireless communication performed by a network entity

1202

Receive a UE capability indication that identifies an intra-band carrier aggregation capability for a half-duplex operation by the UE

1204

Communicate on a sub-band full duplex communication link, wherein the communicating is based at least in part on an evaluation of one or more directional collision handling rules associated with the UE capability indication

FIG. 12

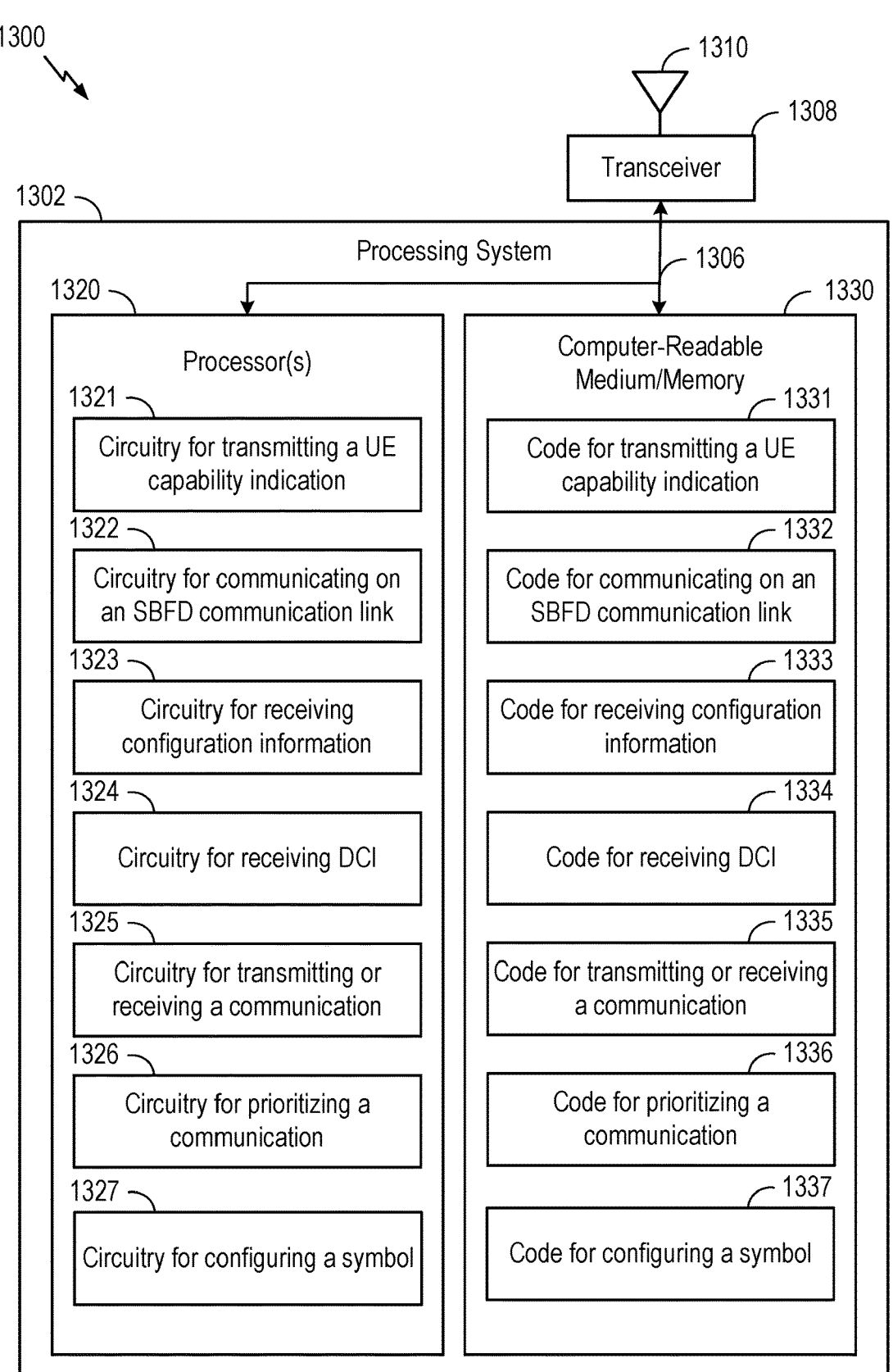

1300

1310

1308

Transceiver

1302

Processing System

1306

1320

Processor(s)

1330

Computer-Readable Medium/Memory

1321

Circuitry for transmitting a UE capability indication

1331

Code for transmitting a UE capability indication

1322

Circuitry for communicating on an SBFD communication link

1332

Code for communicating on an SBFD communication link

1323

Circuitry for receiving configuration information

1333

Code for receiving configuration information

1324

Circuitry for receiving DCI

1334

Code for receiving DCI

1325

Circuitry for transmitting or receiving a communication

1335

Code for transmitting or receiving a communication

1326

Circuitry for prioritizing a communication

1336

Code for prioritizing a communication

1327

Circuitry for configuring a symbol

1337

Code for configuring a symbol

FIG. 13

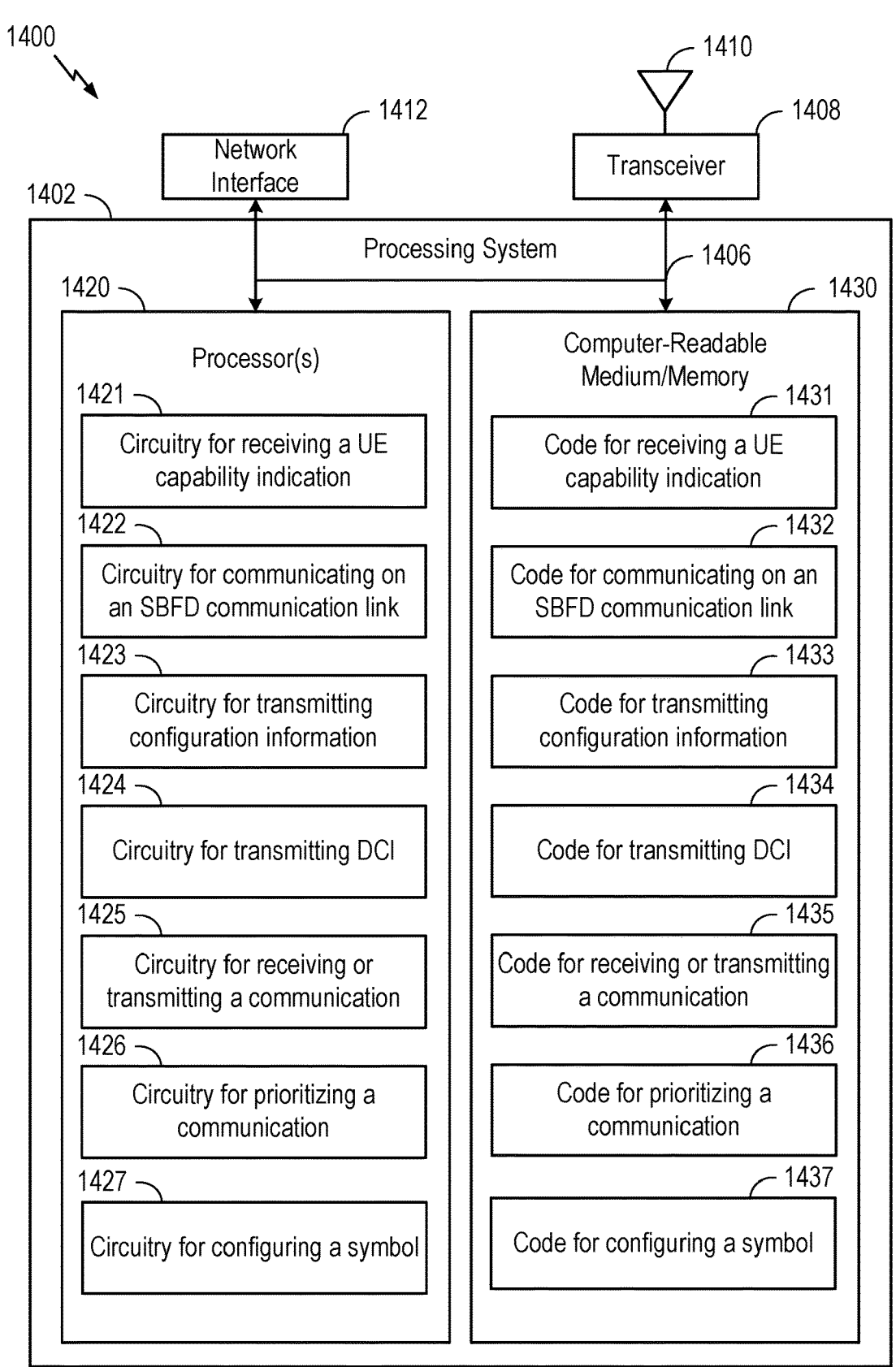

1400

1410

1412

Network Interface

1408

Transceiver

1402

Processing System

1406

1420

Processor(s)

1430

Computer-Readable Medium/Memory

1421

Circuitry for receiving a UE capability indication

1431

Code for receiving a UE capability indication

1422

Circuitry for communicating on an SBFD communication link

1432

Code for communicating on an SBFD communication link

1423

Circuitry for transmitting configuration information

1433

Code for transmitting configuration information

1424

Circuitry for transmitting DCI

1434

Code for transmitting DCI

1425

Circuitry for receiving or transmitting a communication

1435

Code for receiving or transmitting a communication

1426

Circuitry for prioritizing a communication

1436

Code for prioritizing a communication

1427

Circuitry for configuring a symbol

1437

Code for configuring a symbol

FIG. 14

HALF-DUPLEX USER EQUIPMENT OPERATION IN INTRA-BAND CARRIER AGGREGATION SUB-BAND FULL DUPLEX COMMUNICATIONS SYSTEMS

BACKGROUND

Field of the Disclosure

Aspects of the present disclosure relate to wireless communications, and more particularly, to techniques for half-duplex user equipment (UE) operation in intra-band carrier aggregation sub-band full duplex communications systems.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes transmitting a UE capability indication that identifies an intra-band carrier aggregation capability for a half-duplex operation by the UE. The method includes communicating on a sub-band full duplex communication link, wherein the communicating is based at least in part on an evaluation of one or more directional collision handling rules associated with the UE capability indication.

Another aspect provides a method for wireless communication by a network entity. The method includes receiving a UE capability indication that identifies an intra-band carrier aggregation capability for a half-duplex operation by the UE. The method includes communicating on a sub-band full duplex communication link, wherein the communicating is based at least in part on an evaluation of one or more directional collision handling rules associated with the UE capability indication.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 11-12 depict methods for wireless communications.

FIGS. 13-14 depicts aspects of example communications devices.

DETAILED DESCRIPTION

Figure 1:
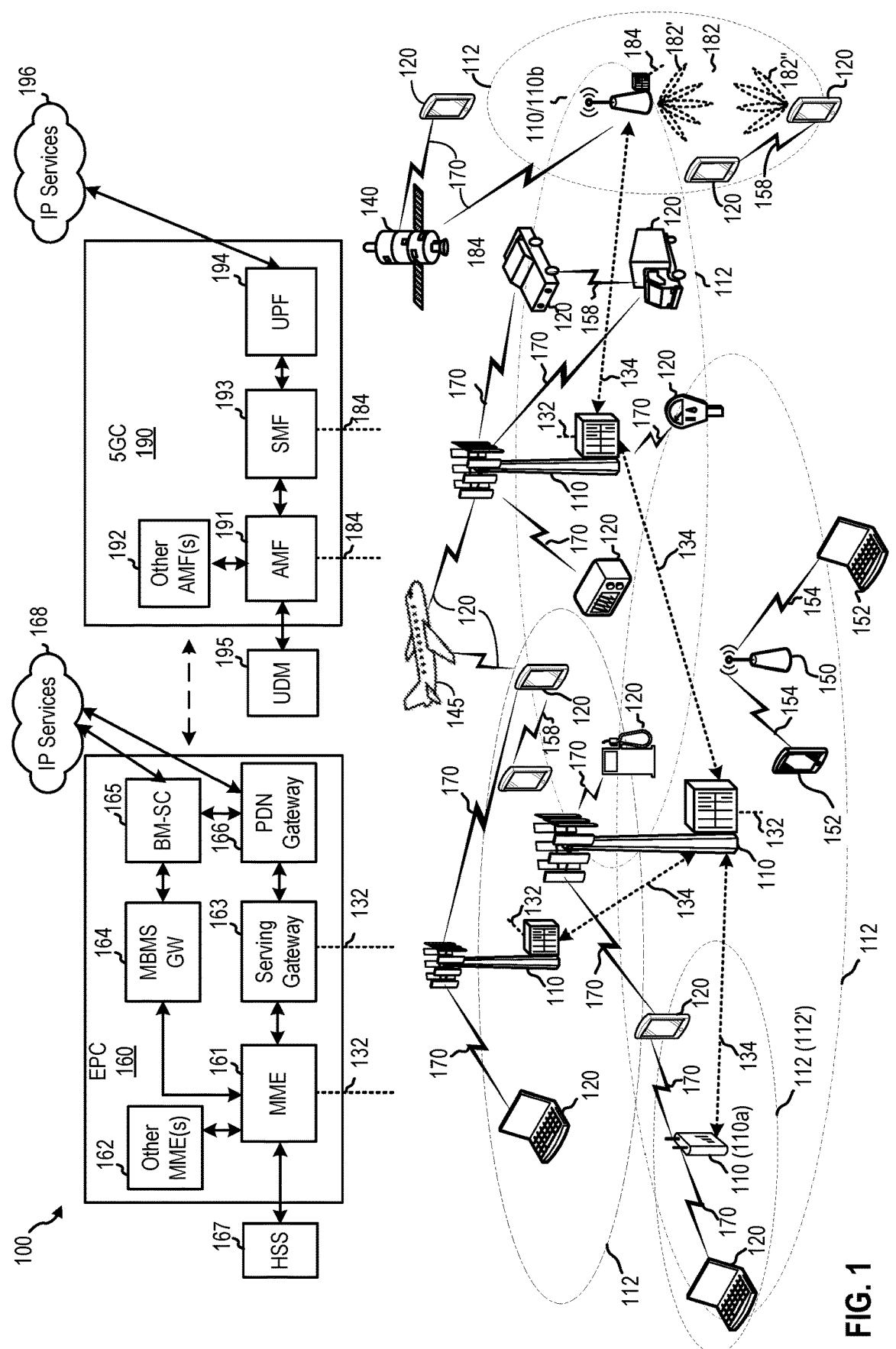
FIG. 1 depicts an example wireless communications network.

Aspects of the present disclosure provide apparatuses, methods, processing systems, and computer-readable mediums for half-duplex user equipment (UE) operation in intra-band carrier aggregation (CA) sub-band full duplex (SBFD) communications systems.

A communications system may provide SBFD communications using a single time-division duplexed (TDD) carrier or using a plurality of carriers with intra-band CA. In the latter deployment scenario, a first carrier may have a first TDD uplink/downlink (UL/DL) configuration, and a second carrier may have a second TDD UL/DL configuration. For example, the first carrier may have a first pattern of symbols (e.g., whether symbols are configured as uplink symbols or downlink symbols), and the second carrier may have a second pattern of symbols. Directional collision handling rules may be defined for a communication system to enable resolution of collisions between different cells during half-duplex TDD CA operation. For example, a directional collision handling rule may allow a UE, when configured semi-statically to receive on a downlink in a reference cell in a particular symbol, to drop a radio resource control (RRC) configured uplink transmission on another cell in the particular symbol. In other words, when the UE has a conflict between a downlink configuration and an uplink configuration and the UE is capable of half-duplex communication, the UE may use a directional collision handling rule to determine which configuration to follow.

However, although directional configuration rules enable resolution of some possible conflict scenarios, other possible conflict scenarios have been defined as an error case that is forbidden from occurring. Although defining a conflict scenario as an error case can prevent the conflict scenario from occurring, such a static rule may limit network flexibility. For example, there may be communication scenarios where it is desirable to allow conflict scenarios that are defined as error cases. However, without a directional conflict resolution rule to cover such conflict scenarios, a UE and a network entity may lose synchronization. In other words, the network entity may not be able to determine which configuration the UE is to follow in such conflict scenarios. As a result, the network entity may not be able to successfully retransmit or request retransmission of any dropped communications. Moreover, when the network entity and the UE are able to request retransmission of any dropped communications, the network entity and the UE may exchange excessive signaling messages associated with enabling retransmission or dropped communications.

Accordingly, some aspects described herein provide directional conflict resolution rules, which may also be referred to as "prioritization rules," for traffic direction conflicts that may occur for a half-duplex UE operating in an intra-band CA SBFD deployment. For example, a UE and a network entity may communicate to determine that the UE is capable of using one or more directional conflict resolution rules, and the network entity may schedule or configure communications with conflict scenarios that the UE and the network entity may resolve using the one or more directional conflict resolution rules. In other words, the UE may transmit a UE capability indicating that the UE is a half-duplex UE and capable of using a set of directional conflict resolution rules for a set of defined error cases. In this case, the UE may receive configuration information configuring communications on one or more cells. The configuration information may include a conflict between, for example, a first cell that is configured with a symbol as an uplink symbol and a second cell that is configured with the symbol as a downlink symbol. In this case, the UE and the network entity may apply the directional conflict resolution rules to resolve the conflict between the first cell and the second cell deterministically for the symbol.

In this way, based at least in part on enabling deterministic resolution of conflicts between configured communication directions in a CA SBFD deployment, the UE and the network entity may identify communications for retransmission without requiring excessive signaling overhead to indicate the communications. In other words, the network entity can "know" that the UE will drop, for example, a downlink communication from the network entity in favor of attempting to transmit an uplink communication to the UE. Further, the UE can "know" that the network entity will "know" that the UE dropped reception of the downlink communication. Accordingly, in one example, the network entity can retransmit the downlink communication without the UE transmitting a request for retransmission. In this way, the UE and the network entity reduce excess signaling overhead. Moreover, by enabling usage of conflict scenarios that were defined as error cases, the UE and the network entity increase flexibility for network operations. For example, the UE and the network entity enable a second message conveying a configuration for a symbol to override a first message that conveyed a configuration for the symbol (based at least in part on a directional conflict resolution rule indicating that the second message is to override the first message) without an explicit indicator of the override. In this way, the UE and the network entity further reduce signaling overhead for network communications.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) device, always on (AON) device, edge processing device, or another similar device. A UE 120 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

BSs 110 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. ABS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 2:
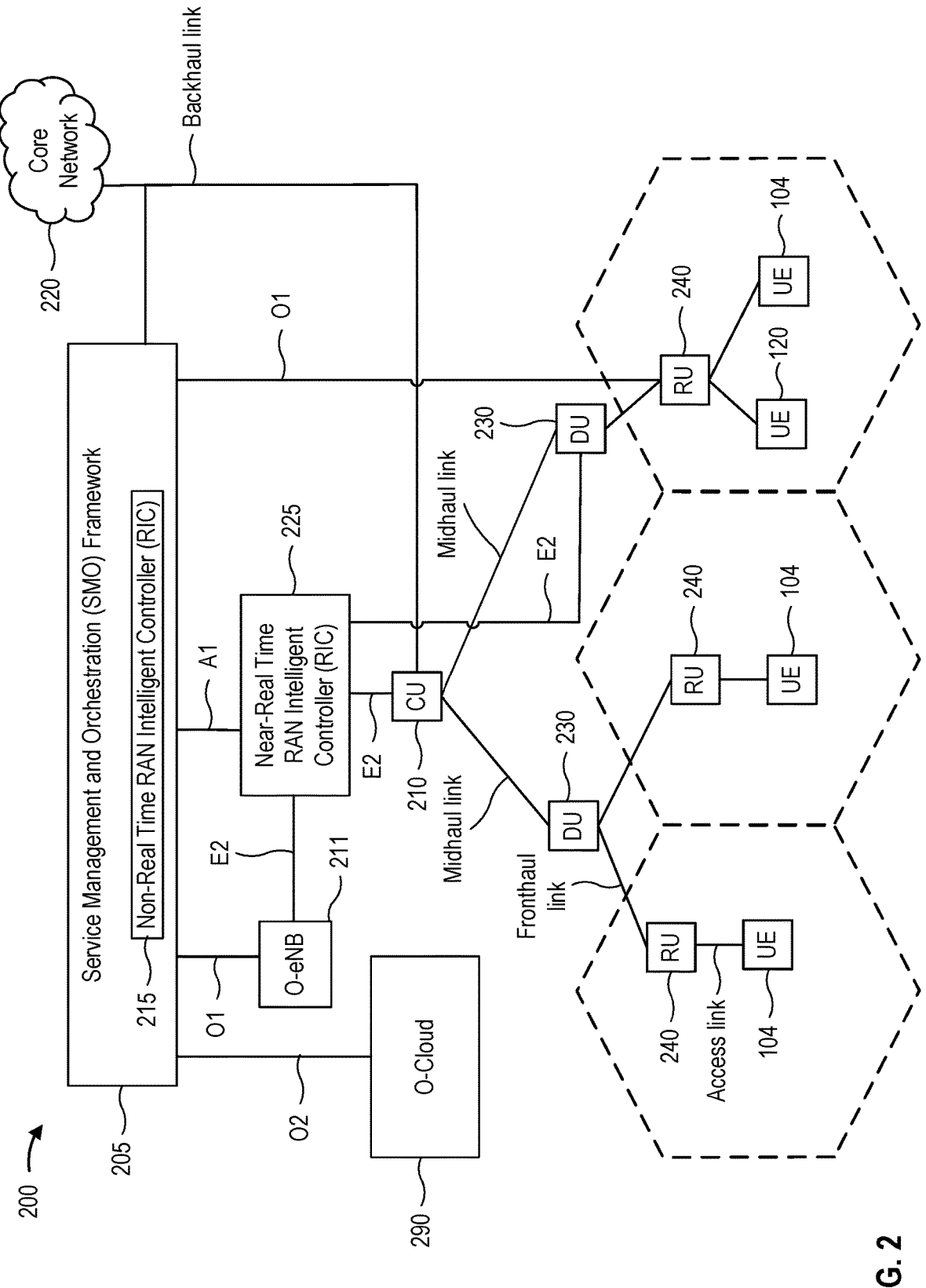
FIG. 2 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 110) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 110 within wireless communications network 100 may also be configured to support different radio access technologies, such as 3G, 4G, and/or 5G. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is the control node that processes the signaling between the UEs 120 and the EPC 160. Generally, MME 161 provides bearer and connection management.

Generally, user Internet protocol (IP) packets are transferred through Serving Gateway 163, which itself is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may be used to distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, or a transmission reception point (TRP), to name a few examples.

FIG. 2 depicts an example disaggregated base station 200 architecture. The disaggregated base station 200 architecture may include one or more CUs 210 that can communicate directly with a core network 220 via a backhaul link, or indirectly with the core network 220 through one or more disaggregated base station units (such as a Near-RT RIC 225 via an E2 link, or a Non-RT RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 120 via one or more radio frequency (RF) access links. In some implementations, the UE 120 may be simultaneously served by multiple RUs 240.

Each of the units (e.g., the CUs 210, the DUs 230, the RUs 240, as well as the Near-RT RICs 225, the Non-RT RICs 215 and the SMO Framework 205) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over-the-air (OTA) communications with one or more UEs 120. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240, and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, artificial intelligence/machine learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
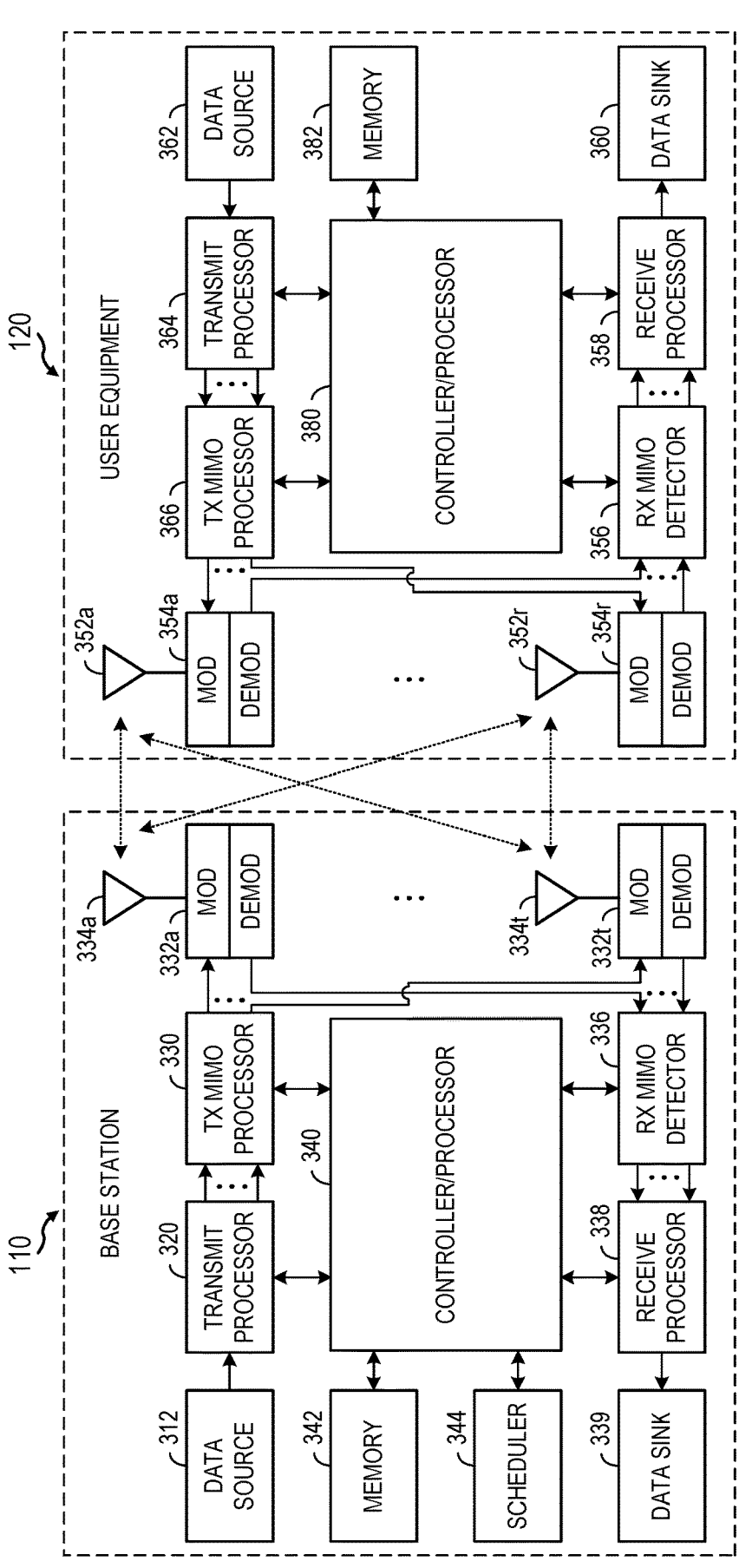
FIG. 3 depicts aspects of an example base station and an example user equipment.

FIG. 3 depicts aspects of an example BS 110 and UE 120.

Generally, BS 110 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 110 may send and receive data between BS 110 and UE 120. BS 110 includes controller/processor 340, which may be configured to implement various functions described herein related to wireless communications.

Generally, UE 120 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 120 includes controller/processor 380, which may be configured to implement various functions described herein related to wireless communications.

In regard to an example downlink transmission, BS 110 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) MIMO processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 120 includes antennas 352a-352r that may receive the downlink signals from the BS 110 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 120 to a data sink 360, and provide decoded control information to a controller/processor 380.

In regard to an example uplink transmission, UE 120 further includes a transmit processor 364 that may receive and process data (e.g., for the physical uplink shared channel (PUSCH)) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 110.

At BS 110, the uplink signals from UE 120 may be received by antennas 334a-t, processed by the demodulators in transceivers 332a-332t, detected by a MIMO detector 336 if applicable, and further processed by a receive processor 338 to obtain decoded data and control information sent by UE 120. Receive processor 338 may provide the decoded data to a data sink 339 and the decoded control information to the controller/processor 340. Memories 342 and 382 may store data and program codes for BS 110 and UE 120, respectively. Scheduler 344 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
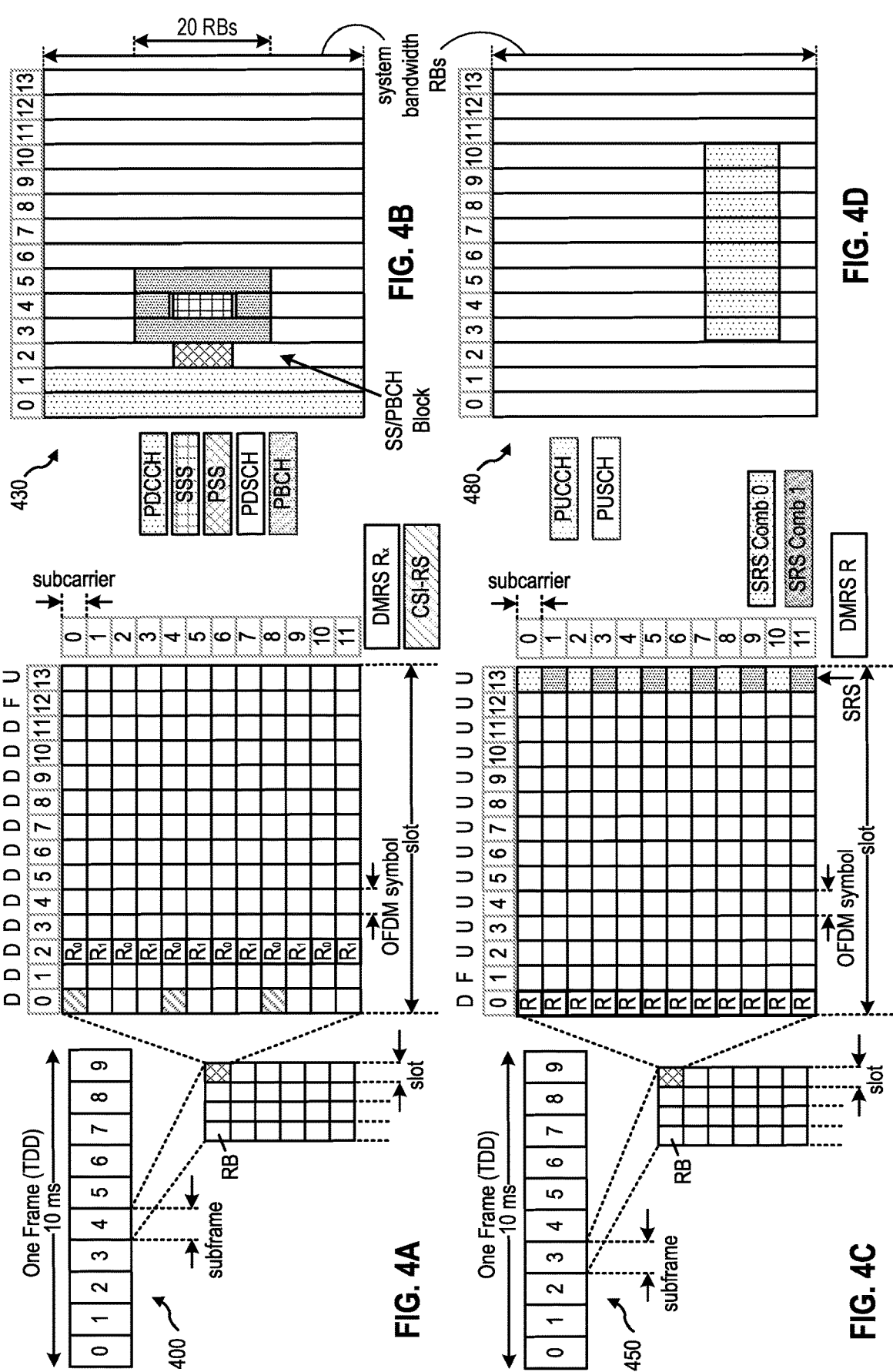
FIGS. 4A, 4B, 4C, and 4D depict various examples of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink Such systems may also support half-duplex operation using TDD. OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also utilize TDD, in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe.

Accordingly, for slot configuration 0 and numerology 1a, there are 14 symbols/slot and $2^\mu$ slots/subframe. The subcarrier spacing and symbol length/duration are a function of the numerology. The subcarrier spacing may be equal to $2^\mu \times 15$ kHz, where μ, is the numerology 0 to 5. Accordingly, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 las.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120 of FIGS. 1 and 3). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 104 of FIG. 2) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block. The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
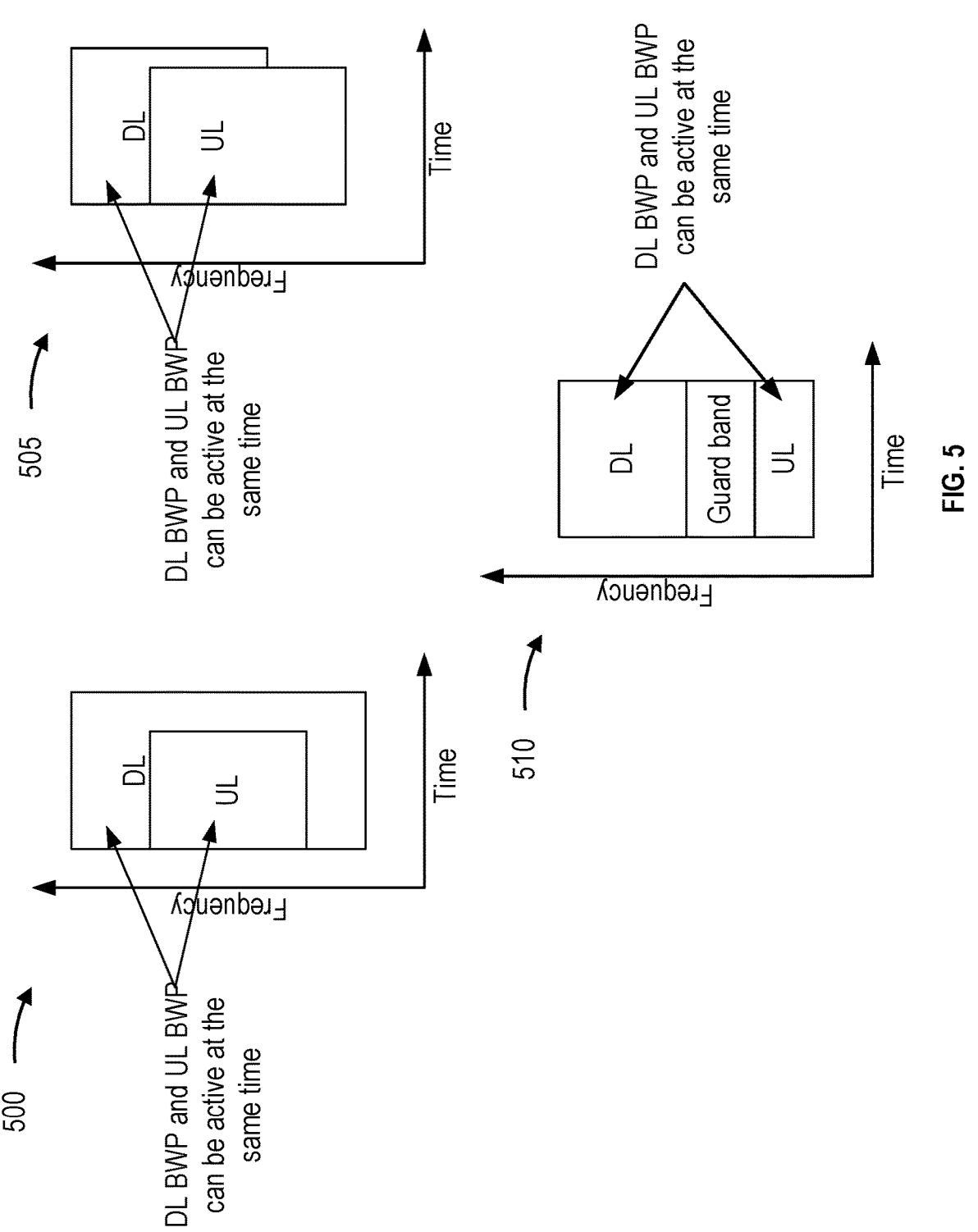
FIGS. 5 and 6 depict examples of duplex communication in a wireless communications network.
Figure 6:
Figure 6:
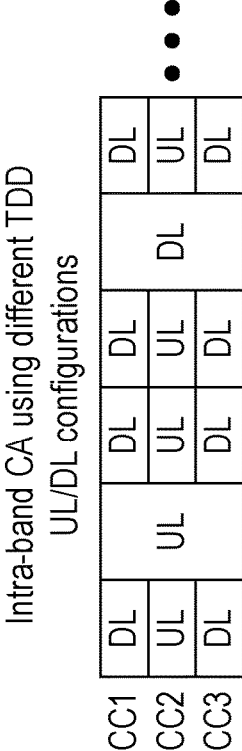
Figure 6:
Figure 6:
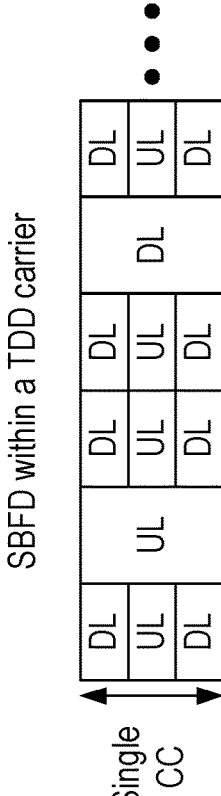

Aspects Related to Half-Duplex UE Operation in Infra-Band Carrier Aggregation Sub-Band Full-Duplex Communications Systems FIGS. 5 and 6 are diagrams illustrating examples 500, 505, 510, 600, and 605 of duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 5, examples 500 and 505 show examples of in-band full-duplex (IBFD) communication. In IBFD, a network entity (e.g., a base station) may transmit a downlink communication to a UE and receive an uplink communication from a UE (e.g., different half-duplex UEs or the same full-duplex UE, among other examples) on the same time and frequency resources. As shown in example 500, in a first example of IBFD, the time and frequency resources for uplink communication may fully overlap with the time and frequency resources for downlink communication. As shown in example 505, in a second example of IBFD, the time and frequency resources for uplink communication may partially overlap with the time and frequency resources for downlink communication.

As further shown in FIG. 5, example 510 shows an example of sub-band full-duplex (SBFD) communication, which may also be referred to as "sub-band frequency division duplex (SBFDD)" or "flexible duplex." In SBFD, a network entity may transmit a downlink communication to a UE and receive an uplink communication from a UE (e.g., different half-duplex UEs or the same full-duplex UE, among other examples) at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

As shown in FIG. 6, examples 600 and 605 show additional examples of SBFD communication. In example 600, SBFD communication may be configured within a time division duplexed (TDD) carrier. For example, a single component carrier bandwidth is divided into a plurality of non-overlapping UL and DL sub-bands. As shown, different sub-bands, within the single component carrier, may have a different pattern of symbols. Similarly, in example 605, SBFD communication may be configured across a plurality of carriers. For example, in intra-band CA, different carriers, within a CA bandwidth, may have different TDD UL/DL configurations. In this case, a first component carrier (CC1)

and a third component carrier (CC3) may have a first symbol pattern (DL, UL, DL, DL, DL) and a second component carrier (CC2) may have a second symbol pattern (UL, UL, UL, UL, DL). Although some aspects are described herein in terms of downlink symbols and uplink symbols, other symbol assignments may be possible, such as a flexible (FL) symbol assignment in which a symbol can be flexibly used for uplink or downlink communication.

As indicated above, FIGS. 5 and 6 are provided as examples. Other examples may differ from what is described with respect to FIGS. 5 and 6.

As described above, duplex communications, such as SBFD communication, allow a symbol to be assigned different directions. For example, a symbol may be assigned as an uplink symbol in a first carrier or cell and as a downlink symbol in a second carrier or cell. A full-duplex wireless communication device, such as a full-duplex network entity or a full-duplex UE, may be capable of communicating in a plurality of directions on a symbol. For example, with reference to the example above, a full-duplex UE may transmit uplink communications on the symbol in the first carrier or cell and may receive downlink communications on the symbol in the second carrier or cell, concurrently. In contrast, a half-duplex UE may be deployed in an SBFD communication system and may not be able to both transmit uplink communications and receive downlink communications (on different carriers or cells) in the same symbol. A half-duplex UE may refer to a UE that is not configured for full-duplex operation or a UE that is configured for full-duplex operation, but that has switched to a half-duplex operation mode. In other words, a half-duplex UE can include a UE that is capable of full-duplex operation but is not using the capability of full-duplex operation, such as to reduce power consumption or processor resource utilization.

When a half-duplex UE is operating in a network with full-duplex communication, such as SBFD communication, a collision may occur between a first communication scheduled in a symbol assigned as an uplink symbol on a first carrier or cell and a second communication scheduled in a symbol assigned as a downlink symbol on a second carrier or cell. In 3GPP Release 16, directional collision handling rules have been introduced to manage such collisions between a reference cell and another cell with half-duplex operation in TDD CA (e.g., with different TDD UL/DL configurations across different component carriers) with a common subcarrier spacing (SCS).

The reference cell is an active cell with a smallest cell index value among a set of configured serving cells. An example, for which a directional collision rule has been introduced for inter-band carrier aggregation, is a scenario in which a UE is scheduled via semi-persistent scheduling with a first SFI indicating downlink communication in the reference cell and via semi-persistent scheduling with a second SFI indicating uplink communication in another cell. In such an example, for inter-band carrier aggregation, the directional collision rule indicates that the UE is to drop the uplink communication on the other cell. In contrast, for intra-band carrier aggregation, the aforementioned example is classified as an error case. Another example is a scenario in which the UE is scheduled via semi-persistent scheduling with an SFI indicating an uplink communication in the reference cell and via RRC scheduling indicating a downlink communication in another cell. In such an example, for inter-band carrier aggregation, the directional collision rule indicates that the UE is to drop the downlink communication On the other cell. Again, for intra-band carrier aggregation, the aforementioned scenario is classified as an error case.

Additional directional collision rules and error cases are described in more detail in 3GPP Technical Specification (TS) 38.213. Although some possible collision scenarios are covered by directional collision rules, other possible collision scenarios are treated as error cases that limit a scheduling flexibility by a network entity and/or result in the network entity needing to transmit additional signaling overhead to specifically indicate how a UE is to resolve specific collision scenarios (e.g., signaling cancelling a first communication to allow a second communication).

As described above, for intra-band carrier aggregation, some possible scenarios have been identified as error cases and may not be allowed (e.g., by network entity configuration). Examples of such error cases with regard to a first assigning in a reference cell and a second, conflicting assigning in another cell are described in Table 1.

TABLE 1

| Reference cell | Other cell |
| --- | --- |
| Semi-static DL | Dynamic (DCI) U |
| Semi-static UL | Dynamic (DCI) DL |
| Dynamic (DCI) D | Dynamic DCI U |
| Dynamic (DCI) UL | Dynamic DCI DL |
| RRC U | Semi-Static DL |
| RRC D | Semi-static UL |
| RRC U | RRC D |
| RRC D | RRC D |

In Table 1, Dynamic U or D refers to an UL or DL DCI format, respectively, associated with scheduling a transmission or reception. RRC U refers to a tdd-UL-DL-ConfigurationCommon or tdd-UL-DL-ConfigurationDedicated parameter that indicates a symbol as uplink. In contrast, RRC D refers to a tdd-UL-DL-ConfigurationCommon or tdd-UL-DL-ConfigurationDedicated parameter that indicates a symbol as downlink Semi-static U may include a PUCCH, PUSCH or PRACH that is configured by higher layer signaling Semi-static D may include a PDCCH, PDSCH or CSI-RS reception that is configured by higher layer signaling. To enable further flexibility for SBFD operation using intra-band carrier aggregation, these error cases can be lifted for a UE that indicates a particular capability. Accordingly, some aspects described herein introduce a set of directional collision rules to enable deterministic handling of (e.g., identification of a proper traffic direction for) intra-band carrier aggregation scheduling that results in a conflict or collision, as described herein.

Example Operations of Entities in a Communications Network

Figure 7:
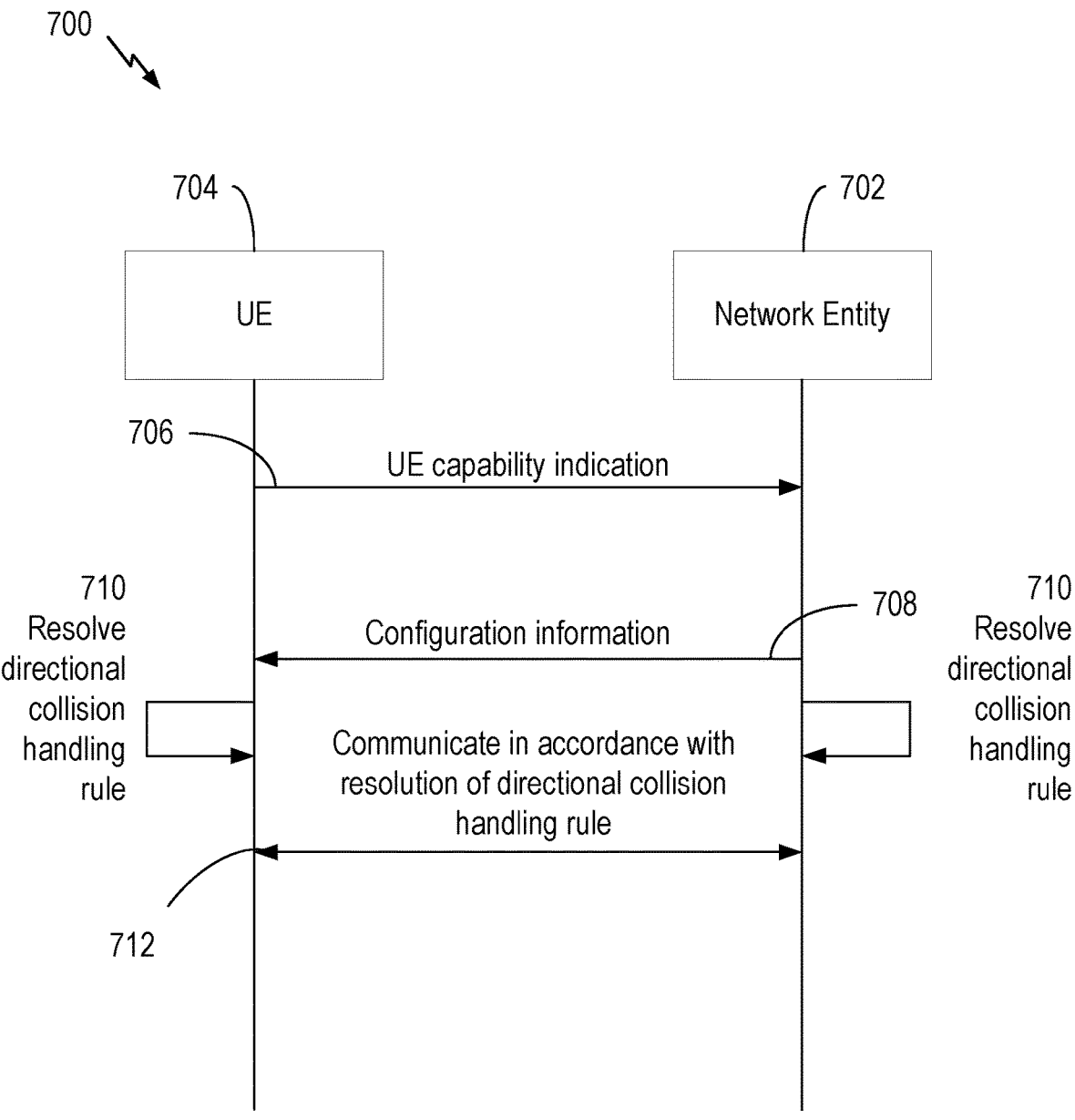
FIGS. 7-10 depict a process flow for communications in a network between a UE and a network entity.
Figure 8:
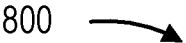
Figure 9:
Figure 9:
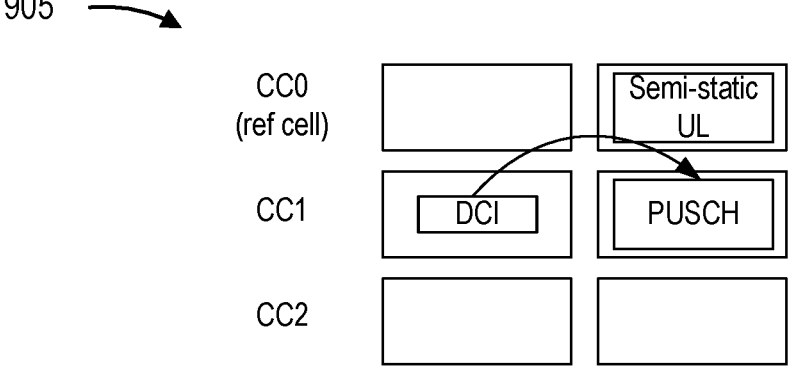
Figure 9:
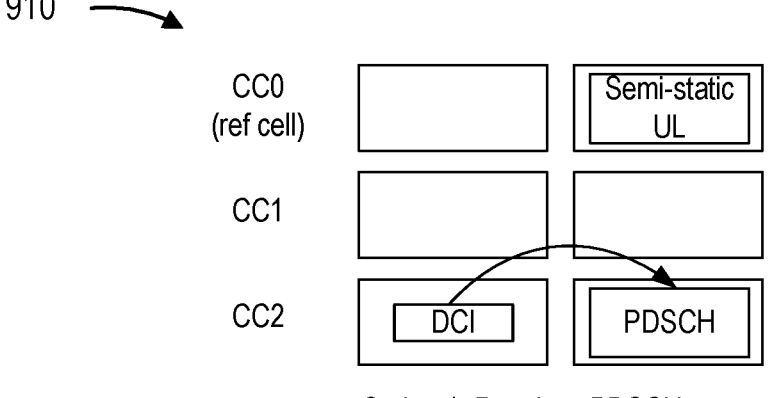
Figure 10:
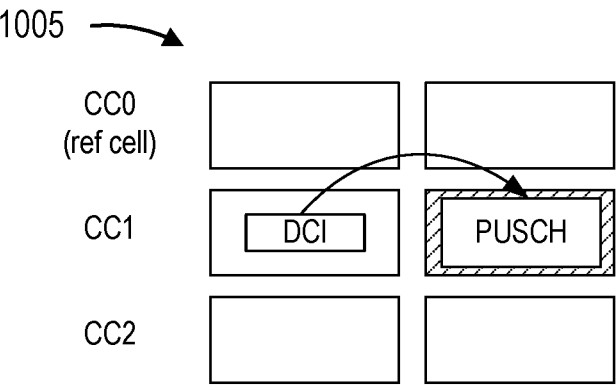
Figure 10:
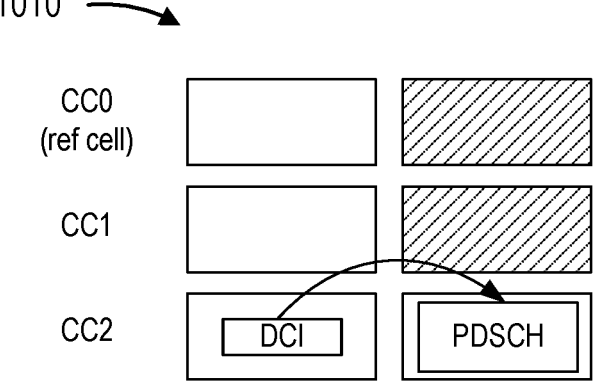

FIG. 7 depicts a process flow 700 for communications in a network between a network entity 702 and a UE 704. In some aspects, the network entity 702 may be an example of the BS 110 depicted and described with respect to FIGS. 1 and 3 or a disaggregated base station depicted and described with respect to FIG. 2. Similarly, the UE 704 may be an example of the UE 120 depicted and described with respect to FIGS. 1 and 3. However, in other aspects, UE 704 may be another type of wireless communications device, and the network entity 702 may be another type of network entity or network node, such as those described herein. FIGS. 8-10 depict examples 800, 900, and 1000 relating to the process flow 700.

As shown in FIG. 7, and by reference numbers 706 and 708, the UE 704 may transmit a UE capability indication to the network entity 702 and may receive configuration information from the network entity 702. For example, the UE 704 may transmit a UE capability indicator to indicate whether the UE 704 is capable of applying a set of directional collision handling rules described herein. In some aspects, the UE 704 may transmit the UE capability indicator RelaxRestrictionIntraBandCA to indicate that the UE 704 is capable of applying the set of directional collision handling rules described herein. For example, the UE 704 may indicate that the UE 704 can apply the set of directional collision handling rules and, based at least in part on the UE 704 so indicating, the network entity 702 may configure the UE 704 in accordance with the set of directional collision handling rules. For example, when the UE 704 indicates support for the set of directional collision handling rules described herein, the network entity 702 may configure the UE 704 with a collision in a symbol that can be resolved using the set of directional collision handling rules.

In contrast, in another example, the UE 704 may not transmit the UE capability indicator or may transmit the UE capability indicator to indicate that the UE 704 is not capable of applying the set of directional collision handling rules described herein. For example, the UE 704 may transmit the aforementioned UE capability indicator to indicate that the UE 704 is not configured to apply the set of directional collision handling rules described herein. In this case, a collision, as described in more detail herein, may be treated as an error case. Treating a collision as an error case may include the network entity 702 avoiding transmitting configuration information that would cause such a collision and the UE 704 not expecting to receive configuration information that would cause such a collision. Furthermore, if the UE 704 does receive configuration information that would cause such a collision, the UE 704 may transmit an error message as a response or may resolve the collision using a UE-implementation-specific resolution rather than a defined directional collision handling rule.

In some aspects, the UE 704 may receive a dedicated configuration or a common configuration to indicate a direction for communication on a carrier or cell in a symbol. For example, the UE 704 may receive first configuration information that conveys a tdd-UL-DL-ConfigurationCommon or a tdd-UL-DL-ConfigurationDedicated information element (IE) for a reference cell to indicate that a symbol has a first direction (e.g., an uplink symbol or a downlink symbol). In this case, a collision scenario may occur when the UE 704 also receives second configuration information to indicate that the symbol has a second direction (e.g., a downlink symbol or an uplink symbol) for another cell (other than the reference cell). In this case, the network entity 702 may convey the second configuration information via DCI. For example, the network entity 702 may transmit, and the UE 704 may detect and receive, DCI with a particular DCI format. In this case, the UE 704 may interpret the DCI as scheduling a communication on the other cell with the second direction (e.g., a downlink communication or an uplink communication) that is different from the first direction indicated for the symbol in the first configuration information.

Additionally, or alternatively, the UE 704 may receive higher layer signaling and DCI signaling scheduling a collision scenario for a symbol. For example, the UE 704 may receive higher layer first configuration information (e.g., an RRC configuration, such as a configuration relating to semi-persistent scheduling (SPS), a CSI-RS, a synchronization signal block (SSB), a configured grant, a PUCCH, a PUSCH, or a PRACH, among other examples) scheduling the UE 704 to transmit a sounding reference signal (SRS), a PUCCH, a PUSCH, or a PRACH, among other examples in a symbol assigned as a flexible symbol on the reference cell and may receive DCI second configuration information scheduling reception in the symbol on another cell. Similarly, the UE 704 may receive higher layer first configuration information scheduling the UE 704 to receive a PDCCH, a PDSCH, or a CSI-RS, among other examples, in the symbol and may receive DCI second configuration information scheduling transmission in the symbol on another cell. In these two cases, among other examples, the UE 704 is being configured to communicate in a first direction on the reference cell and a second, different direction on another cell in the same symbol.

Additionally, or alternatively, the UE 704 may receive a plurality of DCI messages scheduling a collision scenario for a symbol. For example, the UE 704 may receive first DCI with a first format that schedules a transmission in a symbol on a first cell and second DCI with a second format that schedules a reception in the symbol on a second cell. Similarly, the UE 704 may receive first DCI with a first format that schedules reception in the symbol on the first cell and second DCI with a second format that schedules transmission in the symbol on the second cell. In some aspects, the first cell or the second cell may be a reference cell.

Additionally, or alternatively, the UE 704 may receive first configuration information via a tdd-UL-DL-ConfigurationCommon IE to configure a symbol as a first direction on a reference cell and second configuration information via a tdd-UL-DL-ConfigurationDedicated IE to configure the symbol as a second direction on another cell. Similarly, the UE 704 may receive first configuration information via a tdd-UL-DL-ConfigurationDedicated IE to configure a symbol as a first direction on a reference cell and second configuration information via a tdd-UL-DL-ConfigurationCommon IE to configure the symbol as a second direction on another cell.

As further shown in FIG. 7, and by reference number 710, the UE 704 and/or the network entity 702 may resolve a directional collision handling rule. For example, the UE 704 may resolve a collision between first configuration information that configures communication in a first direction on a first cell in a symbol and second configuration information that configures communication in a second direction on a second cell in the symbol. In some aspects, the UE 704 may resolve, using a directional collision handling rule, a collision between first DCI scheduling a first communication in a first direction on a first cell and second DCI scheduling a second communication in a second direction on a second cell. For example, the UE 704 may resolve the collision based at least in part on a reference cell DCI. In this case, when the UE 704 receives the first DCI on a reference cell and the second DCI on another cell, the UE 704 may drop the second communication in the second direction in favor of the first communication in the first direction. Dropping a communication may include delaying, cancelling, or deleting a transmission of data or other information associated with the communication. Additionally, or alternatively, dropping a communication may include not tuning to a frequency, setting an antenna, or performing monitoring to attempt to receive data or other information associated with the communication.

Additionally, or alternatively, the UE 704 may resolve, using a directional collision handling rule, a collision between the first DCI and the second DCI based at least in part on an order of the DCI. For example, the UE 704 may drop the second communication associated with (scheduled by) the second DCI, in favor of the first communication associated with (scheduled by) the first DCI, which was received before (or, in another example, after) the second DCI. As shown in FIG. 8, and by diagram 805, both a first DCI and a second DCI are received on a reference cell (CC0) in a first symbol and a second symbol, respectively. The first DCI schedules a PDSCH in a third symbol (on the reference cell) and the second DCI schedules a PUSCH in the third symbol (on another cell). In this case, the UE 704 and the network entity 702 may prioritize the PUSCH on the other cell based at least in part on the second DCI being received after the first DCI.

Additionally, or alternatively, the UE 704 may resolve, using a directional collision handling rule, a collision between the first DCI and the second DCI based at least in part on a cell on which respective communications are scheduled. For example, when the first DCI schedules the first communication on the reference cell and the second DCI schedules the second communication on another cell (even when the first DCI is not received on the reference cell), the UE 704 may drop the second communication in favor of the first communication. As shown in FIG. 8, and by diagram 810, a first DCI that schedules a PUSCH is received in a first symbol on CC1 (a non-reference cell) and a second DCI that schedules a PDSCH is received in a second symbol on CC0 (the reference cell). In this case, the UE 704 and the network entity 702 may prioritize the second DCI and the PDSCH based at least in part on the second DCI being received on the reference cell.

Additionally, or alternatively, the UE 704 may resolve, using a directional collision handling rule, a collision between the first DCI and the second DCI based at least in part on a physical channel/signal priority or a logical channel priority. For example, when the first DCI schedules the first communication with a first priority that is higher than a second priority associated with (assigned to) the second communication scheduled by the second DCI, the UE 704 may drop the second communication. Additionally, or alternatively, the UE 704 may resolve, using a directional collision handling rule, a collision between the first DCI and the second DCI based at least in part on a duplex mode. For example, when the first DCI schedules transmission or reception with a full duplex configuration and the second DCI schedules transmission or reception with a half-duplex configuration, the UE 704 may follow (prioritize) the first communication over the second communication (e.g., the second communication may be dropped).

Additionally, or alternatively, the UE 704 may resolve, using a directional collision handling rule, a collision between the first DCI and the second DCI based at least in part on a traffic arrival time. For example, when traffic associated with the first communication is scheduled to occur before the second communication, the UE 704 may drop the second communication in favor of the first communication.

Additionally, or alternatively, the UE 704 may resolve, using a directional collision handling rule, a collision between the first DCI and the second DCI based at least in part on a repetition factor. For example, the UE 704 may prioritize the first communication, which has a first quantity of scheduled repetitions, over a second communication, which has a second quantity of scheduled repetitions. As shown in FIG. 8, and by diagram 815, a first DCI, which schedules a PDSCH, is received in a first symbol and a second DCI, which schedules a set of PUSCHs, is received in the first symbol. The PDSCH is associated with (e.g., is scheduled for) a single repetition and the PUS CH is associated with (e.g., is scheduled for) a plurality of repetitions (e.g., in a third symbol, a fourth symbol, and a fifth symbol). In this case, the UE 704 and the network entity 702 may prioritize the PUSCH over the PDSCH based at least in part on the PUSCH being scheduled for more repetitions (3) than the PDSCH (1).

Additionally, or alternatively, the UE 704 may resolve, using a directional collision handling rule, a collision between the first DCI and the second DCI based at least in part on an identifier. For example, when the first communication is on a first carrier with a first identifier (e.g., a first component carrier (CC) identifier (ID) (CC-ID)) and the second communication is on a second carrier with a second identifier, the UE 704 may favor the first communication when the first identifier is lower (or, in another example, higher) than the second identifier. Additionally, or alternatively, the UE 704 may resolve, using a directional collision handling rule, a collision between the first DCI and the second DCI based at least in part on a slot offset value. For example, the UE 704 may prioritize a communication with a largest (or, in another example, smallest) slot offset value (e.g., a k0 or k2 parameter).

In some aspects, the UE 704 may resolve, using a directional collision handling rule, a collision between a first configuration, which is semi-statically configured (e.g., via a MAC CE message scheduling a downlink or uplink symbol), and a second configuration, which is dynamically configured (e.g., via DCI scheduling a downlink or uplink communication). As an example, as shown in FIG. 9, and by diagrams 905 and 910, DCI may schedule an uplink communication (e.g., a PUSCH) that conflicts with a semi-statically configured downlink symbol or a downlink communication (e.g., a PDSCH) that conflicts with a semi-statically configured uplink symbol, respectively. In some aspects, in accordance with a directional collision handling rule, the UE 704 may prioritize a first configuration that is dynamically scheduled (e.g., via DCI) over a second configuration that is semi-statically configured. For example, the UE 704 may prioritize the PUSCH or the PDSCH over the semi-static downlink symbol or the semi-static uplink symbol, respectively.

Additionally, or alternatively, the UE 704 may prioritize a first communication that is associated with a first priority that is higher than a second priority of a second communication. For example, when a scheduled downlink communication on the semi-statically configured downlink symbol has a higher priority than a higher-layer configured communication (e.g., an SRS, a PUCCH, a PUSCH, or a PRACH), among other examples, the UE 704 may drop the higher-layer configured communication. Similarly, when a scheduled uplink communication on the semi-statically configured uplink symbol has a higher priority than a higher-layer configured communication (e.g., a PDCCH, a PDSCH, or a CSI-RS), the UE 704 may drop the higher-layer configured communication. Additionally, or alternatively, the UE 704 may prioritize a communication scheduled on the reference cell, as described above. For example, when the DCI is received on a reference cell and the semi-static configuration is received on another cell, the UE 704 may prioritize a communication scheduled by the DCI. Alternatively, as shown in FIG. 9, when the semi-statically configured symbol is on the reference cell, the UE 704 may prioritize communications scheduled for the semi-statically configured symbol in the reference cell over communications scheduled in another cell by the DCI.

In some aspects, the UE 704 may resolve, using a directional collision handling rule, a collision between a first configuration, which is RRC configured (e.g., via an RRC message scheduling a downlink or uplink symbol), and a second configuration, which is dynamically configured (e.g., via DCI scheduling a downlink or uplink communication). As an example, as shown in FIG. 10, and by diagrams 1005 and 1010, DCI may schedule an uplink communication (e.g., a PUSCH) that conflicts with an RRC configured downlink symbol or a downlink communication (e.g., a PDSCH) that conflicts with an RRC configured uplink symbol, respectively. In some aspects, in accordance with a directional collision handling rule, the UE 704 may prioritize a first configuration that is dynamically scheduled (e.g., via DCI) over a second configuration that is RRC configured. For example, the UE 704 may prioritize the PUSCH over the RRC configured downlink symbol and treat the RRC configured downlink symbol as a flexible symbol. Similarly, the UE 704 may prioritize the PDSCH over the RRC configured uplink symbol and treat the RRC configured uplink symbol as a flexible symbol.

In some aspects, the UE 704 may resolve, using a directional collision handling rule, a collision between a first configuration, which is RRC configured (e.g., via a first RRC message configuring a symbol with a first direction), and a second configuration, which is RRC configured (e.g., via a second RRC message configuring the symbol with a second direction). In some aspects, in accordance with a directional collision handling rule, the UE 704 may prioritize a configuration based at least in part on which cell the symbol is configured. For example, when there is a conflict between the first configuration and the second configuration with respect to the symbol on a non-reference cell, the UE 704 may treat the symbol on the non-reference cell as a flexible symbol. Additionally, or alternatively, when there is a conflict between the first configuration and the second configuration with respect to the symbol on a reference cell, the UE 704 may treat the symbol on the reference cell as a flexible symbol. Additionally, or alternatively, when there is a conflict between the first configuration and the second configuration with respect to any symbol in an SBFD set of carriers, the UE 704 may treat the symbol as a flexible symbol across all carriers of the SBFD set of carriers.

As further shown in FIG. 7, and by reference number 712, the UE 704 and the network entity 702 may communicate in accordance with resolution of a directional collision handling rule. For example, based at least in part on being configured with a pattern of symbols (e.g., a pattern of whether a set of symbols are uplink or downlink symbols), the UE 704 may receive or transmit in the set of symbols in accordance with the pattern of symbols. Additionally, or alternatively, based at least in part on resolving one or more collisions, the UE 704 may communicate in accordance with the resolution of the one or more collisions. For example, the UE 704 may drop a transmission of a first communication and receive a second communication or drop reception of the first communication and transmit the second communication, as described above.

Example Operations of a User Equipment

FIG. 11 shows a method 1100 for wireless communications by a UE, such as the UE 120 of FIGS. 1 and 3 or the UE 704 of FIG. 7.

Method 1100 begins at 1102 with transmitting a UE capability indication that identifies an intra-band carrier aggregation capability for a half-duplex operation by the UE.

Method 1100 then proceeds to step 1104 with communicating on a sub-band full duplex communication link, wherein the communicating is based at least in part on an evaluation of one or more directional collision handling rules associated with the UE capability indication.

Method 1100 may include additional aspects, such as any single aspect or any combination of aspects described below and/or in connection with one or more other processes described elsewhere herein.

In a first aspect, method 1100 includes receiving configuration information associated with configuring communication on the sub-band full duplex communication link, and wherein the communicating on the sub-band full duplex communication link comprises communicating on the sub-band full duplex communication link based at least in part on the configuration information.

In a second aspect, alone or in combination with the first aspect, the configuration information includes a common configuration or dedicated configuration identifying an uplink symbol for a first cell and a downlink control information format to schedule reception on the uplink symbol on a second cell.

In a third aspect, alone or in combination with one or more of the first and second aspects, the configuration information includes a common configuration or dedicated configuration identifying a downlink symbol for a first cell and a downlink control information format to schedule transmission on the downlink symbol on the second cell.

In a fourth aspect, alone or in combination with one or more of the first through third aspects, the configuration information includes a higher layer configuration of a transmission on a flexible symbol in a first cell and a reception on the flexible symbol in a second cell, wherein the transmission or the reception is at least one of a sounding reference signal, an uplink control channel, an uplink shared channel, a random access channel, a downlink control channel, a downlink shared channel, or a channel state information reference signal.

In a fifth aspect, alone or in combination with one or more of the first through fourth aspects, the configuration information includes information identifying a first downlink control information format to schedule a transmission on a symbol in a first cell and a second downlink control information format to schedule a reception on the symbol in a second cell.

In a sixth aspect, alone or in combination with one or more of the first through fifth aspects, the configuration information includes a common configuration or a dedicated configuration identifying a symbol that is a downlink symbol on a first cell and an uplink symbol on a second cell, or that is the uplink symbol on the first cell and the downlink symbol on the second cell.

In a seventh aspect, alone or in combination with one or more of the first through sixth aspects, the communicating on the sub-band full duplex communication link comprises receiving, on a symbol in a first cell, first DCI that schedules a first communication, receiving, on the symbol in a second cell, second DCI that schedules a second communication, and transmitting or receiving the first communication or the second communication based at least in part on the one or more directional collision handling rules.

In an eighth aspect, alone or in combination with one or more of the first through seventh aspects, the one or more directional collision handling rules include a directional collision handling rule associated with at least one of whether the first cell or the second cell is a reference cell, an order of reception of the first DCI and the second DCI, whether the first communication or the second communication is on the reference cell, respective priorities of the first DCI and the second DCI, a type of duplex mode of the first communication or the second communication, an order of the first communication and the second communication, a repetition amount of the first communication or the second communication, respective priorities of a first carrier associated with the first communication and a second carrier associated with the second communication, or a slot offset value.

In a ninth aspect, alone or in combination with one or more of the first through eighth aspects, method 1100 includes receiving DCI dynamically scheduling a first communication that collides with a semi-statically scheduled second communication, and wherein the one or more directional collision handling rules include a directional collision handling rule associated with at least one of prioritizing the first communication scheduled by the DCI, whether the first communication scheduled by the DCI is associated with a first priority that is higher than a second priority that is associated with the second communication, or whether the first communication by the DCI is associated with a reference cell.

In a tenth aspect, alone or in combination with one or more of the first through ninth aspects, method 1100 includes receiving configuration information that includes an indication of a first direction of a symbol, receiving DCI that indicates a second direction for the symbol, wherein the DCI is associated with a higher priority than the configuration information, and wherein the communicating on the sub-band full duplex communication link comprises communicating in the second direction on the communication link, wherein the symbol is a flexible symbol based at least in part on the DCI being associated with the higher priority than the configuration information.

In an eleventh aspect, alone or in combination with one or more of the first through tenth aspects, the one or more directional collision handling rules includes a directional collision handling rule associated with at least one of configuring a symbol as flexible only on a non-reference cell, configuring the symbol as flexible only on a reference cell, or configuring the symbol as flexible on the non-reference cell and the reference cell.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Operations of a Network Entity

FIG. 12 shows a method 1200 for wireless communications by a network entity, such as the BS 110 of FIGS. 1 and 3, the distributed base station architecture of FIG. 2, or the network entity 702 of FIG. 7.

Method 1200 begins at 1202 with receiving a UE capability indication that identifies an intra-band carrier aggregation capability for a half-duplex operation by the UE.

Method 1200 then proceeds to step 1204 with communicating on a sub-band full duplex communication link, wherein the communicating is based at least in part on an evaluation of one or more directional collision handling rules associated with the UE capability indication.

Method 1200 may include additional aspects, such as any single aspect or any combination of aspects described below and/or in connection with one or more other processes described elsewhere herein.

In a first aspect, method 1200 includes transmitting configuration information associated with configuring communication on the sub-band full duplex communication link, and wherein the communicating on the sub-band full duplex communication link comprises communicating on the sub-band full duplex communication link based at least in part on the configuration information.

In a second aspect, alone or in combination with the first aspect, the configuration information includes a common configuration or dedicated configuration identifying an uplink symbol for a first cell and a downlink control information format to schedule transmission on the uplink symbol on a second cell.

In a third aspect, alone or in combination with one or more of the first and second aspects, the configuration information includes a common configuration or dedicated configuration identifying a downlink symbol for a first cell and a downlink control information format to schedule reception on the downlink symbol on the second cell.

In a fourth aspect, alone or in combination with one or more of the first through third aspects, the configuration information includes a higher layer configuration of a reception on a flexible symbol in a first cell and a transmission on the flexible symbol in a second cell, wherein the reception or the transmission is at least one of a sounding reference signal, an uplink control channel, an uplink shared channel, a random access channel, a downlink control channel, a downlink shared channel, or a channel state information reference signal.

In a fifth aspect, alone or in combination with one or more of the first through fourth aspects, the configuration information includes information identifying a first downlink control information format to schedule a reception on a symbol in a first cell and a second downlink control information format to schedule a transmission on the symbol in a second cell.

In a sixth aspect, alone or in combination with one or more of the first through fifth aspects, the configuration information includes a common configuration or a dedicated configuration identifying a symbol that is a downlink symbol on a first cell and an uplink symbol on a second cell or that is the uplink symbol on the first cell and the downlink symbol on the second cell.

In a seventh aspect, alone or in combination with one or more of the first through sixth aspects, method 1200 includes transmitting, on a symbol in a first cell, first DCI that schedules a first communication, transmitting, on the symbol in a second cell, second DCI that schedules a second communication, and receiving or transmitting the first communication or the second communication based at least in part on the one or more directional collision handling rules.

In an eighth aspect, alone or in combination with one or more of the first through seventh aspects, the one or more directional collision handling rules include a directional collision handling rule associated with at least one of whether the first cell or the second cell is a reference cell, an order of reception of the first DCI and the second DCI, whether the first communication or the second communication is on the reference cell, respective priorities of the first DCI and the second DCI, a type of duplex mode of the first communication or the second communication, an order of the first communication and the second communication, a repetition amount of the first communication or the second communication, respective priorities of a first carrier associated with the first communication and a second carrier associated with the second communication, or a slot offset value.

In a ninth aspect, alone or in combination with one or more of the first through eighth aspects, method 1200 includes transmitting DCI dynamically scheduling a first communication that collides with a semi-statically scheduled second communication, and wherein the one or more directional collision handling rules include a directional collision handling rule associated with at least one of prioritizing the first communication scheduled by the DCI, whether the first communication scheduled by the DCI is associated with a first priority that is higher than a second priority that is associated with the second communication, or whether the first communication by the DCI is associated with a reference cell.

In a tenth aspect, alone or in combination with one or more of the first through ninth aspects, method 1200 includes transmitting configuration information that includes an indication of a first direction of a symbol, transmitting DCI that indicates a second direction for the symbol, wherein the DCI is associated with a higher priority than the configuration information, and wherein the communicating on the sub-band full duplex communication link comprises communicating in the second direction on the communication link, wherein the symbol is a flexible symbol based at least in part on the DCI being associated with the higher priority than the configuration information.

In an eleventh aspect, alone or in combination with one or more of the first through tenth aspects, the one or more directional collision handling rules includes a directional collision handling rule associated with at least one of configuring a symbol as flexible only on a non-reference cell, configuring the symbol as flexible only on a reference cell, or configuring the symbol as flexible on the non-reference cell and the reference cell.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, the communications device 1300 is a UE, such as the UE 120 described above with respect to FIGS. 1 and 3 or the UE 704 described above with respect to FIG. 7.

The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes one or more processors 1320. In various aspects, the one or more processors 1320 may be representative of one or more of receive processor 358, transmit processor 364, TX MIMO processor 366, and/or controller/processor 380, as described with respect to FIG. 3. The one or more processors 1320 are coupled to a computer-readable medium/memory 1330 via a bus 1306. In certain aspects, the computer-readable medium/ memory 1330 is configured to store instructions (e.g., com- puter-executable code) that when executed by the one or more processors 1320, cause the one or more processors 1320 to perform the method 1100 described with respect to FIG. 11, or any aspect related to it. Note that reference to a processor performing a function of communications device 1300 may include one or more processors performing that function of communications device 1300.

In the depicted example, computer-readable medium/ memory 1330 stores code (e.g., executable instructions) for transmitting a UE capability indication 1331, code for communicating on a SBFD communication link 1332, code for receiving configuration information 1333, code for receiving DCI 1334, code for transmitting or receiving a communication 1335, code for prioritizing a communication 1336, and code for configuring a symbol 1337. Processing of the code 1331-1337 may cause the communications device 1300 to perform the method 1100 described with respect to FIG. 11, or any aspect related to it.

The one or more processors 1320 include circuitry con- figured to implement (e.g., execute) the code stored in the computer-readable medium/memory 1330, including cir- cuitry for transmitting a UE capability indication 1321, circuitry for communicating on a SBFD communication link 1322, circuitry for receiving configuration information 1323, circuitry for receiving DCI 1324, circuitry for trans- mitting or receiving a communication 1325, circuitry for prioritizing a communication 1326, and circuitry for con- figuring a symbol 1327. Processing with circuitry 1321- 1327 may cause the communications device 1300 to perform the method 1100 described with respect to FIG. 11, or any aspect related to it.

Various components of the communications device 1300 may provide means for performing the method 1100 described with respect to FIG. 11, or any aspect related to it. For example, means for transmitting, sending, or outputting for transmission may include the transceivers 354 and/or antenna(s) 352 of the UE 120 illustrated in FIG. 3 and/or transceiver 1308 and antenna 1310 of the communications device 1300 in FIG. 13. Means for receiving or obtaining may include the transceivers 354 and/or antenna(s) 352 of the UE 120 illustrated in FIG. 3 and/or transceiver 1308 and antenna 1310 of the communications device 1300 in FIG. 13.

FIG. 14 depicts aspects of an example communications device. In some aspects, communications device 1400 is a network entity, such as BS 110 of FIGS. 1 and 3, or a disaggregated base station as discussed with respect to FIG. 2.

The communications device 1400 includes a processing system 1402 coupled to a transceiver 1408 (e.g., a transmit- ter and/or a receiver) and/or a network interface 1412. The transceiver 1408 is configured to transmit and receive sig- nals for the communications device 1400 via an antenna 1410, such as the various signals as described herein. The network interface 1412 is configured to obtain and send signals for the communications device 1400 via communi- cations link(s), such as a backhaul link, midhaul link, and/or fronthaul link as described herein, such as with respect to FIG. 2. The processing system 1402 may be configured to perform processing functions for the communications device 1400, including processing signals received and/or to be transmitted by the communications device 1400.

The processing system 1402 includes one or more pro- cessors 1420. In various aspects, one or more processors 1420 may be representative of one or more of receive processor 338, transmit processor 320, TX MIMO processor 330, and/or controller/processor 340, as described with respect to FIG. 3. The one or more processors 1420 are coupled to a computer-readable medium/memory 1430 via a bus 1406. In certain aspects, the computer-readable medium/ memory 1430 is configured to store instructions (e.g., com- puter-executable code) that when executed by the one or more processors 1420, cause the one or more processors 1420 to perform the method 1200 described with respect to FIG. 12, or any aspect related to it. Note that reference to a processor of communications device 1400 performing a function may include one or more processors of communi- cations device 1400 performing that function.

In the depicted example, the computer-readable medium/ memory 1430 stores code (e.g., executable instructions) for receiving a UE capability indication 1431, code for com- municating on an SBFD communication link 1432, code for transmitting configuration information 1433, code for trans- mitting DCI 1434, code for receiving or transmitting a communication 1435, code for prioritizing a communication 1436, and code for configuring a symbol 1437. Processing of the code 1431-1437 may cause the communications device 1400 to perform the method 1200 described with respect to FIG. 12, or any aspect related to it.

The one or more processors 1420 include circuitry con- figured to implement (e.g., execute) the code stored in the computer-readable medium/memory 1430, including cir- cuitry for receiving a UE capability indication 1421, cir- cuitry for communicating on an SBFD communication link 1422, circuitry for transmitting configuration information 1423, circuitry for transmitting DCI 1424, circuitry for receiving or transmitting a communication 1425, circuitry for prioritizing a communication 1426, and circuitry for configuring a symbol 1427. Processing with circuitry 1421- 1427 may cause the communications device 1400 to perform the method 1200 as described with respect to FIG. 12, or any aspect related to it.

Various components of the communications device 1400 may provide means for performing the method 1200 as described with respect to FIG. 12, or any aspect related to it. Means for transmitting, sending, or outputting for transmis- sion may include the transceivers 332 and/or antenna(s) 334 of the BS 110 illustrated in FIG. 3 and/or transceiver 1408 and antenna 1410 of the communications device 1400 in FIG. 14. Means for receiving or obtaining may include the transceivers 332 and/or antenna(s) 334 of the BS 110 illustrated in FIG. 3 and/or transceiver 1408 and antenna 1410 of the communications device 1400 in FIG. 14.

Example Clauses

Implementation examples are described in the following numbered clauses:

Clause 1: A method of wireless communication performed by a user equipment (UE), comprising: transmitting a UE capability indication that identifies an intra-band carrier aggregation capability for a half-duplex opera- tion by the UE; and communicating on a sub-band full duplex communication link, wherein the communicat- ing is based at least in part on an evaluation of one or more directional collision handling rules associated with the UE capability indication.

Clause 2: The method of Clause 1, further comprising: receiving configuration information associated with configuring communication on the sub-band full duplex communication link; and wherein the communicating on the sub-band full duplex communication link comprises: communicating on the sub-band full duplex communication link based at least in part on the configuration information.

Clause 3: The method of Clause 2, wherein the configuration information includes a common configuration or dedicated configuration identifying an uplink symbol for a first cell and a downlink control information format to schedule reception on the uplink symbol on a second cell.

Clause 4: The method of any of Clauses 2 to 3, wherein the configuration information includes a common configuration or dedicated configuration identifying a downlink symbol for a first cell and a downlink control information format to schedule transmission on the downlink symbol on the second cell.

Clause 5: The method of any of Clauses 2 to 4, wherein the configuration information includes a higher layer configuration of a transmission on a flexible symbol in a first cell and a reception on the flexible symbol in a second cell, wherein the transmission or the reception is at least one of: a sounding reference signal, an uplink control channel, an uplink shared channel, a random access channel, a downlink control channel, a downlink shared channel, or a channel state information reference signal.

Clause 6: The method of any of Clauses 2 to 5, wherein the configuration information includes information identifying: a first downlink control information format to schedule a transmission on a symbol in a first cell and a second downlink control information format to schedule a reception on the symbol in a second cell.

Clause 7: The method of any of Clauses 2 to 6, wherein the configuration information includes a common configuration or a dedicated configuration identifying a symbol that is a downlink symbol on a first cell and an uplink symbol on a second cell, or that is the uplink symbol on the first cell and the downlink symbol on the second cell.

Clause 8: The method of any of Clauses 1 to 7, wherein the communicating on the sub-band full duplex communication link comprises: receiving, on a symbol in a first cell, first downlink control information (DCI) that schedules a first communication; receiving, on the symbol in a second cell, second DCI that schedules a second communication; and transmitting or receiving the first communication or the second communication based at least in part on the one or more directional collision handling rules.

Clause 9: The method of Clause 8, wherein the one or more directional collision handling rules include a directional collision handling rule associated with at least one of: whether the first cell or the second cell is a reference cell, an order of reception of the first DCI and the second DCI, whether the first communication or the second communication is on the reference cell, respective priorities of the first DCI and the second DCI, a type of duplex mode of the first communication or the second communication, an order of the first communication and the second communication, a repetition amount of the first communication or the second communication, respective priorities of a first carrier associated with the first communication and a second carrier associated with the second communication, or a slot offset value.

Clause 10: The method of any of Clauses 1 to 9, further comprising: receiving downlink control information (DCI) dynamically scheduling a first communication that collides with a semi-statically scheduled second communication, and wherein the one or more directional collision handling rules include a directional collision handling rule associated with at least one of: prioritizing the first communication scheduled by the DCI, whether the first communication scheduled by the DCI is associated with a first priority that is higher than a second priority that is associated with the second communication, or whether the first communication by the DCI is associated with a reference cell.

Clause 11: The method of any of Clauses 1 to 10, further comprising: receiving configuration information that includes an indication of a first direction of a symbol; receiving downlink control information (DCI) that indicates a second direction for the symbol, wherein the DCI is associated with a higher priority than the configuration information; and wherein the communicating on the sub-band full duplex communication link comprises: communicating in the second direction on the communication link, wherein the symbol is a flexible symbol based at least in part on the DCI being associated with the higher priority than the configuration information.

Clause 12: The method of any of Clauses 1 to 11, wherein the one or more directional collision handling rules includes a directional collision handling rule associated with at least one of: configuring a symbol as flexible only on a non-reference cell, configuring the symbol as flexible only on a reference cell, or configuring the symbol as flexible on the non-reference cell and the reference cell.

Clause 13: A method of wireless communication performed by a network entity, comprising: receiving a user equipment (UE) capability indication that identifies an intra-band carrier aggregation capability for a half-duplex operation by the UE; and communicating on a sub-band full duplex communication link, wherein the communicating is based at least in part on an evaluation of one or more directional collision handling rules associated with the UE capability indication.

Clause 14: The method of Clause 13, further comprising: transmitting configuration information associated with configuring communication on the sub-band full duplex communication link; and wherein the communicating on the sub-band full duplex communication link comprises: communicating on the sub-band full duplex communication link based at least in part on the configuration information.

Clause 15: The method of Clause 14, wherein the configuration information includes a common configuration or dedicated configuration identifying an uplink symbol for a first cell and a downlink control information format to schedule transmission on the uplink symbol on a second cell.

Clause 16: The method of any of Clauses 14 to 15, wherein the configuration information includes a common configuration or dedicated configuration identifying a downlink symbol for a first cell and a downlink control information format to schedule reception on the downlink symbol on the second cell.

Clause 17: The method of any of Clauses 14 to 16, wherein the configuration information includes a higher layer configuration of a reception on a flexible symbol in a first cell and a transmission on the flexible symbol in a second cell, wherein the reception or the transmission is at least one of: a sounding reference signal, an uplink control channel, an uplink shared channel, a random access channel, a downlink control channel, a downlink shared channel, or a channel state information reference signal.

Clause 18: The method of any of Clauses 14 to 17, wherein the configuration information includes information identifying: a first downlink control information format to schedule a reception on a symbol in a first cell and a second downlink control information format to schedule a transmission on the symbol in a second cell.

Clause 19: The method of any of Clauses 14 to 18, wherein the configuration information includes a common configuration or a dedicated configuration identifying a symbol that is a downlink symbol on a first cell and an uplink symbol on a second cell or that is the uplink symbol on the first cell and the downlink symbol on the second cell.

Clause 20: The method of any of Clauses 14 to 19, comprises: transmitting, on a symbol in a first cell, first downlink control information (DCI) that schedules a first communication; transmitting, on the symbol in a second cell, second DCI that schedules a second communication; and receiving or transmitting the first communication or the second communication based at least in part on the one or more directional collision handling rules.

Clause 21: The method of Clause 20, wherein the one or more directional collision handling rules include a directional collision handling rule associated with at least one of: whether the first cell or the second cell is a reference cell, an order of reception of the first DCI and the second DCI, whether the first communication or the second communication is on the reference cell, respective priorities of the first DCI and the second DCI, a type of duplex mode of the first communication or the second communication, an order of the first communication and the second communication, a repetition amount of the first communication or the second communication, respective priorities of a first carrier associated with the first communication and a second carrier associated with the second communication, or a slot offset value.

Clause 22: The method of any of Clauses 13 to 21, further comprising: transmitting downlink control information (DCI) dynamically scheduling a first communication that collides with a semi-statically scheduled second communication, and wherein the one or more directional collision handling rules include a directional collision handling rule associated with at least one of: prioritizing the first communication scheduled by the DCI, whether the first communication scheduled by the DCI is associated with a first priority that is higher than a second priority that is associated with the second communication, or whether the first communication by the DCI is associated with a reference cell.

Clause 23: The method of any of Clauses 13 to 22, further comprising: transmitting configuration information that includes an indication of a first direction of a symbol; transmitting downlink control information (DCI) that indicates a second direction for the symbol, wherein the DCI is associated with a higher priority than the configuration information; and wherein the communicating on the sub-band full duplex communication link comprises: communicating in the second direction on the communication link, wherein the symbol is a flexible symbol based at least in part on the DCI being associated with the higher priority than the configuration information. wherein the communicating on the sub-band full duplex communication link comprises: communicating in the second direction on the communication link, wherein the symbol is a flexible symbol based at least in part on the DCI being associated with the higher priority than the configuration information.

Clause 24: The method of any of Clauses 13 to 23, wherein the one or more directional collision handling rules includes a directional collision handling rule associated with at least one of: configuring a symbol as flexible only on a non-reference cell, configuring the symbol as flexible only on a reference cell, or configuring the symbol as flexible on the non-reference cell and the reference cell.

Clause 25: An apparatus, comprising: a memory comprising executable instructions; and a processor configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by a processor of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Additional Considerations

The preceding description is provided to enable any person skilled in the art to practice the various aspects described herein. The examples discussed herein are not limiting of the scope, applicability, or aspects set forth in the claims Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims

What is claimed is:

1. A method of wireless communication performed by a user equipment (UE), comprising:
 transmitting a UE capability indication that identifies an intra-band carrier aggregation capability for a half-duplex operation by the UE;
 communicating on a sub-band full duplex communication link based at least in part on an evaluation of one or more directional collision handling rules associated with the UE capability indication, and based at least in part on received configuration information,
 wherein the configuration information includes:
  a common configuration or a dedicated configuration identifying a symbol that is a downlink symbol on a first cell or second cell, or an uplink symbol on the first cell or the second cell; or
  information identifying a first downlink control information format to schedule a transmission on the symbol in the first cell and a second downlink control information format to schedule a reception on the symbol in the second cell.

2. The method of claim 1, wherein the configuration information includes the common configuration or the dedicated configuration identifying the symbol that is the uplink symbol on the first cell and a downlink control information format.

3. The method of claim 1, wherein the configuration information includes the common configuration or the dedicated configuration identifying the symbol that is the downlink symbol on the first cell and a downlink control information format to schedule the uplink symbol for transmission on the second cell.

4. The method of claim 1, wherein the configuration information includes information identifying the first downlink control information format to schedule the transmission on the symbol in the first cell and the second downlink control information format to schedule the reception on the symbol in the second cell.

5. The method of claim 1, wherein the configuration information includes the common configuration or the dedicated configuration identifying the symbol that is the downlink symbol on the first cell and the uplink symbol on the second cell, or that is the uplink symbol on the first cell and the downlink symbol on the second cell.

6. The method of claim 1, wherein the communicating on the sub-band full duplex communication link comprises:
 receiving, in the first cell, first downlink control information (DCI) that schedules a first communication;
 receiving, in the second cell, second DCI that schedules a second communication; and
 transmitting or receiving the first communication or the second communication based at least in part on the one or more directional collision handling rules.

7. The method of claim 6, wherein the one or more directional collision handling rules include a directional collision handling rule associated with at least one of:
 whether the first cell or the second cell is a reference cell,
 an order of reception of the first DCI and the second DCI,
 whether the first communication or the second communication is on the reference cell,
 respective priorities of scheduled transmission or reception by the first DCI and the second DCI,
 a type of duplex mode of the first communication or the second communication,
 an order of the first communication and the second communication,
 a repetition amount of the first communication or the second communication,
 respective priorities of a first carrier associated with the first communication and a second carrier associated with the second communication, or
 a slot offset value.

8. The method of claim 1, further comprising:
 receiving downlink control information (DCI) dynamically scheduling a first communication on the first cell that collides with a semi-statically scheduled second communication on the second cell, and wherein the one or more directional collision handling rules include a directional collision handling rule associated with at least one of:

prioritizing the first communication scheduled by the DCI, whether the first communication scheduled by the DCI is associated with a first priority that is higher than a second priority that is associated with the second communication, or whether the first communication scheduled by the DCI is associated with a reference cell.

9. The method of claim 1, further comprising:

receiving configuration information that includes an indication of a first direction of the symbol; and receiving downlink control information (DCI) that indicates a second direction for the symbol, wherein the DCI is associated with a higher priority than the configuration information; and wherein the communicating on the sub-band full duplex communication link comprises:

communicating in the second direction on the sub-band full duplex communication link, wherein the symbol is a flexible symbol based at least in part on the DCI being associated with the higher priority than the configuration information.

10. The method of claim 1, wherein the one or more directional collision handling rules include a directional collision handling rule associated with at least one of:

configuring the symbol as flexible only on a non-reference cell, configuring the symbol as flexible only on a reference cell, or configuring the symbol as flexible on the non-reference cell and the reference cell.

11. A user equipment (UE) for wireless communication, comprising one or more processors, coupled to one or more memories, and configured to cause the UE to:

transmit a UE capability indication that identifies an intra-band carrier aggregation capability for a half-duplex operation by the UE; and communicate on a sub-band full duplex communication link based at least in part on an evaluation of one or more directional collision handling rules associated with the UE capability indication, and based at least in part on received configuration information, wherein the configuration information includes:

a common configuration or a dedicated configuration identifying a symbol that is a downlink symbol on a first cell or second cell, or an uplink symbol on the first cell or the second cell; or information identifying a first downlink control information format to schedule a transmission on the symbol in the first cell and a second downlink control information format to schedule a reception on the symbol in the second cell.

12. A method of wireless communication performed by a user equipment (UE), comprising:

transmitting a UE capability indication that identifies an intra-band carrier aggregation capability for a half-duplex operation by the UE;

communicating on a sub-band full duplex communication link based at least in part on an evaluation of one or more directional collision handling rules associated with the UE capability indication; and resolving, using a directional collision handling rule of the one or more directional collision handling rules, a collision between a first downlink control information (DCI) and a second DCI based at least in part on a repetition factor, wherein resolving the collision based at least in part on the repetition factor comprises prioritizing the first DCI over the second DCI based at least in part on the first DCI being scheduled for a larger quantity of repetitions than the second DCI.

13. The UE of claim 11, wherein the configuration information includes the common configuration or the dedicated configuration identifying the symbol that is the uplink symbol on the first cell and a downlink control information format.

14. The UE of claim 11, wherein the configuration information includes the common configuration or the dedicated configuration identifying the symbol that is the downlink symbol on the first cell and a downlink control information format to schedule the uplink symbol, for transmission on the second cell.

15. The UE of claim 11, wherein the configuration information includes information identifying the first downlink control information format to schedule the transmission on the symbol in the first cell and the second downlink control information format to schedule the reception on the symbol in the second cell.

16. The UE of claim 11, wherein the configuration information includes the common configuration or the dedicated configuration identifying the symbol that is the downlink symbol on the first cell and the uplink symbol on the second cell, or that is the uplink symbol on the first cell and the downlink symbol on the second cell.

17. The UE of claim 11, wherein to communicate on the sub-band full duplex communication link, the one or more processors are configured to cause the UE to:

receive, in the first cell, first downlink control information (DCI) that schedules a first communication;

receive, in the second cell, second DCI that schedules a second communication; and transmit or receiving the first communication or the second communication based at least in part on the one or more directional collision handling rules.

18. The UE of claim 17, wherein the one or more directional collision handling rules include a directional collision handling rule associated with at least one of:

whether the first cell or the second cell is a reference cell, an order of reception of the first DCI and the second DCI, whether the first communication or the second communication is on the reference cell, respective priorities of scheduled transmission or reception by the first DCI and the second DCI, a type of duplex mode of the first communication or the second communication, an order of the first communication and the second communication, a repetition amount of the first communication or the second communication, respective priorities of a first carrier associated with the first communication and a second carrier associated with the second communication, or a slot offset value.

19. The UE of claim 11, wherein the one or more processors are configured to cause the UE to:

receive downlink control information (DCI) dynamically scheduling a first communication on the first cell that collides with a semi-statically scheduled second communication on the second cell, and wherein the one or more directional collision handling rules include a directional collision handling rule associated with at least one of:

prioritizing the first communication scheduled by the DCI, whether the first communication scheduled by the DCI is associated with a first priority that is higher than a second priority that is associated with the second communication, or whether the first communication scheduled by the DCI is associated with a reference cell.

20. The UE of claim 11, wherein the one or more processors are configured to cause the UE to:

receive configuration information that includes an indication of a first direction of the symbol; and receive downlink control information (DCI) that indicates a second direction for the symbol, wherein the DCI is associated with a higher priority than the configuration information; and wherein to communicate on the sub-band full duplex communication link, the one or more processors are configured to cause the UE to:

communicate in the second direction on the sub-band full duplex communication link, wherein the symbol is a flexible symbol based at least in part on the DCI being associated with the higher priority than the configuration information.

21. The UE of claim 11, wherein the one or more directional collision handling rules include a directional collision handling rule associated with at least one of:

configuring the symbol as flexible only on a non-reference cell, configuring the symbol as flexible only on a reference cell, or configuring the symbol as flexible on the non-reference cell and the reference cell.

22. A user equipment (UE) for wireless communication, comprising one or more processors, coupled to one or more memories, and configured to cause the UE to:

transmit a UE capability indication that identifies an intra-band carrier aggregation capability for a half-duplex operation by the UE;

communicate on a sub-band full duplex communication link based at least in part on an evaluation of one or more directional collision handling rules associated with the UE capability indication; and resolve, using a directional collision handling rule of the one or more directional collision handling rules, a collision between a first downlink control information (DCI) and a second DCI based at least in part on a repetition factor, wherein to resolve the collision based at least in part on the repetition factor, the one or more processors are configured to cause the UE to prioritize the first DCI over the second DCI based at least in part on the first DCI being scheduled for a larger quantity of repetitions than the second DCI.

* * * * *